(12) United States Patent
Schlieber et al.

(10) Patent No.: US 7,762,874 B2
(45) Date of Patent: Jul. 27, 2010

(54) SHAPING DEVICE AND SHAPING METHOD FOR FORMING ROUNDED TIPS ON THE ENDS OF SAUSAGES

(75) Inventors: Markus Schlieber, Wain (DE); Siegfried Reutter, Eberhardzell (DE); Franz Muller, Eberhardzell-Ampfelbronn (DE); Manfred Bachtle, Schemmerhofen (DE)

(73) Assignee: Albert H. Handtmann Maschinenfabrik GmbH & Co. KG, Biberach (DE)

( * ) Notice: Subject to any disclaimer, the term of this patent is extended or adjusted under 35 U.S.C. 154(b) by 360 days.

(21) Appl. No.: 11/301,384

(22) Filed: Dec. 13, 2005

(65) Prior Publication Data
US 2006/0160482 A1 Jul. 20, 2006

(30) Foreign Application Priority Data
Dec. 14, 2004 (EP) .................................. 04029574

(51) Int. Cl.
A22C 11/10 (2006.01)
A22C 11/00 (2006.01)
(52) U.S. Cl. ............................... 452/37; 452/47; 452/48
(58) Field of Classification Search ............. 452/30–32, 452/36–37, 46–51
See application file for complete search history.

(56) References Cited

U.S. PATENT DOCUMENTS

| 3,220,052 A | * | 11/1965 | Heydn ........................... 452/46 |
| 3,435,482 A | * | 4/1969 | Ziolko ........................... 452/47 |
| 4,044,425 A | * | 8/1977 | Nausedas ....................... 452/45 |
| 4,214,492 A | * | 7/1980 | Hoffman ......................... 83/24 |
| 4,420,856 A | * | 12/1983 | Ziolko ........................... 452/46 |
| 4,750,239 A | | 6/1988 | Niedecker |
| 4,796,332 A | * | 1/1989 | Stanley ......................... 452/48 |
| 5,145,451 A | | 9/1992 | Staudenrausch |
| 5,709,600 A | | 1/1998 | Xie et al. |
| 6,045,445 A | * | 4/2000 | Hummel et al. ................ 452/46 |
| 6,080,054 A | * | 6/2000 | Muller et al. .................. 452/49 |
| 6,219,998 B1 | | 4/2001 | Demming et al. |
| 6,705,063 B1 | | 3/2004 | Topfer et al. |

FOREIGN PATENT DOCUMENTS

| DE | 3911983 A1 | 10/1990 |
| DE | 101 09 000 A1 | 9/2002 |

(Continued)

OTHER PUBLICATIONS

Submission to European Patent Office containing Notice of Opposition to European Patent No. 1 671 546, dated Nov. 20, 2008.

*Primary Examiner*—David J Parsley
(74) *Attorney, Agent, or Firm*—Marshall, Gerstein & Borun LLP

(57) ABSTRACT

A shaping device and a method of forming rounded tips on the ends of sausages and of tying off and/or parting into individual portions a continuously produced sausage skein filled with paste material, with two oppositely located displacement assemblies, which move towards one another and between which the filled sausage skein can be moved in the transport direction, wherein the displacement assemblies are formed such that two opening sections are formed, which widen out in the transport direction, respectively opposite the transport direction, in a tying off and/or parting position between the two displacement assemblies.

14 Claims, 3 Drawing Sheets

FOREIGN PATENT DOCUMENTS

| | | |
|---|---|---|
| EP | 0 239 144 | 9/1987 |
| EP | 0 473 799 | 3/1992 |
| EP | 0 904 698 | 3/1999 |
| EP | 1 042 957 | 10/2000 |
| EP | 1371293 | 12/2003 |
| FR | 2 725 877 A1 | 4/1996 |
| FR | 2 748 634 A1 | 11/1997 |
| GB | 1 481 321 | 7/1977 |
| JP | 63-281971 * | 11/1988 |
| WO | WO 03030646 | 4/2003 |

* cited by examiner

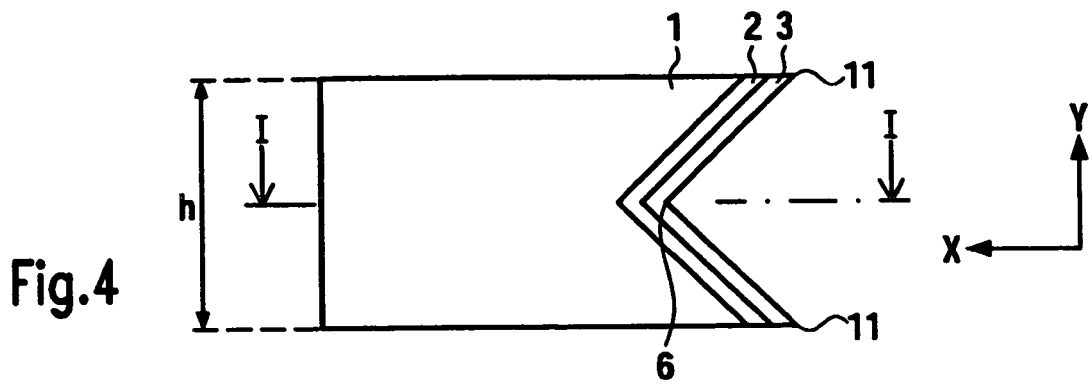
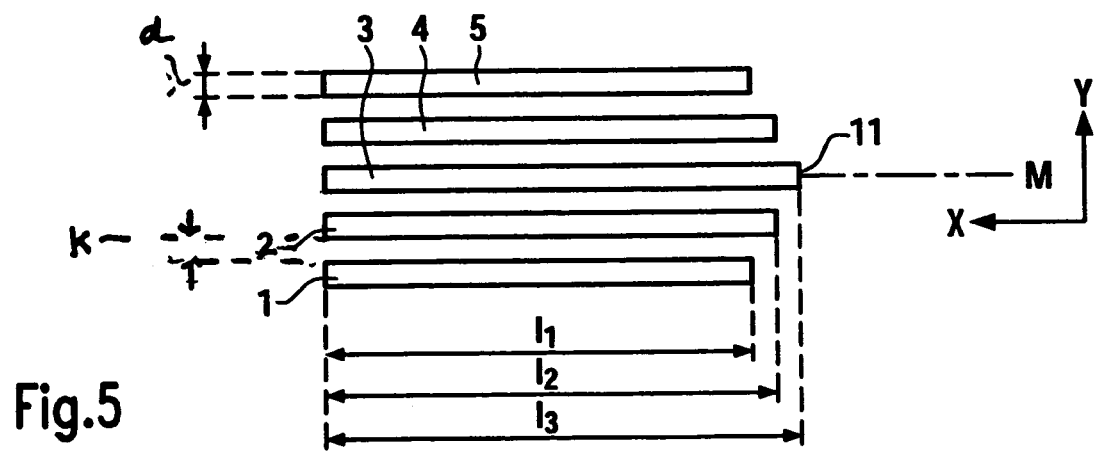
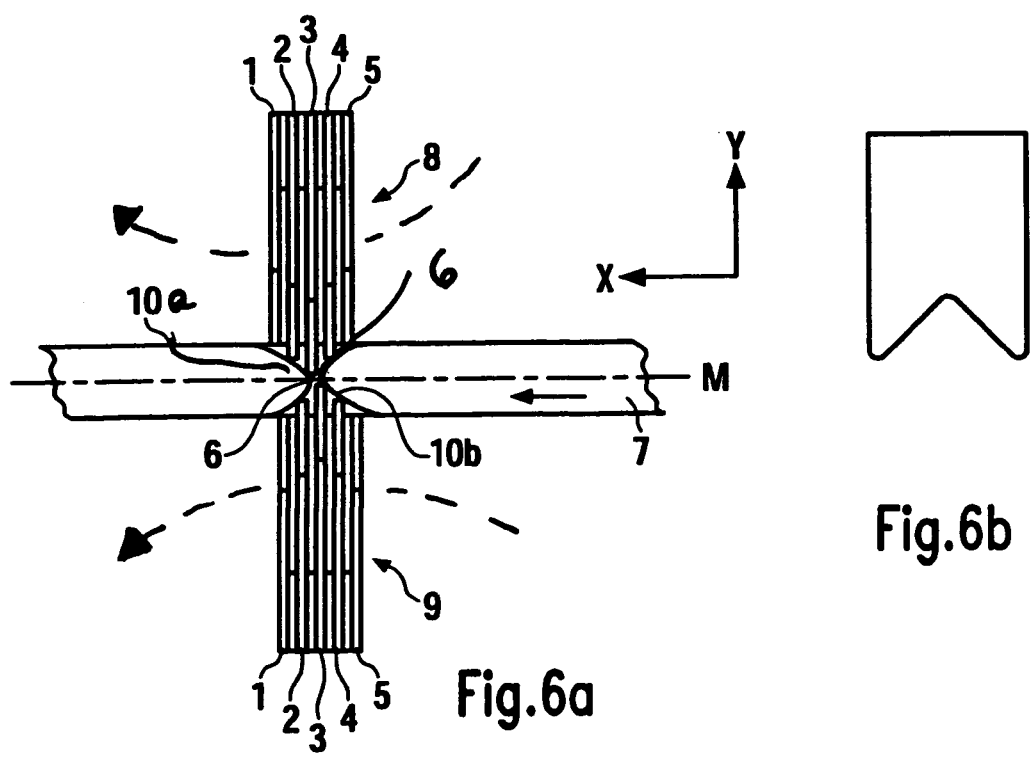

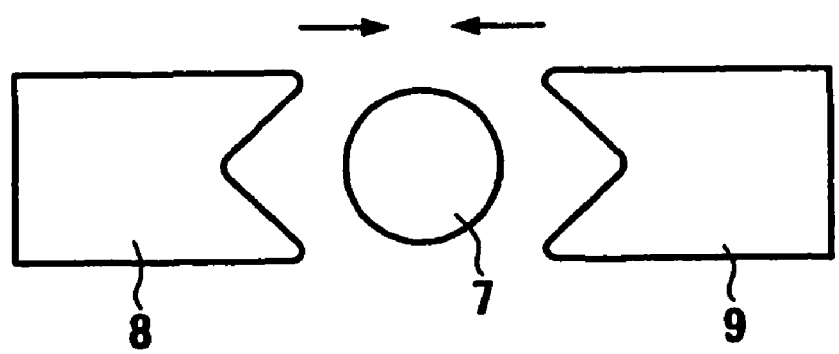
Fig. 7a
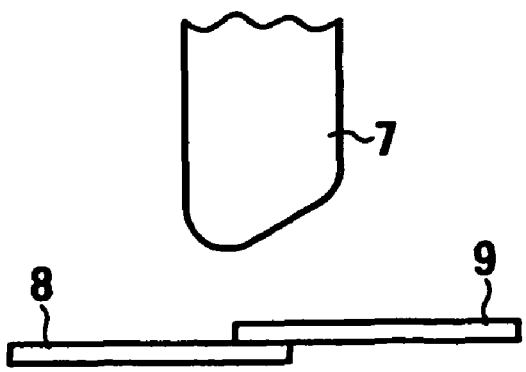
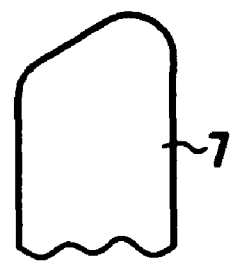
Fig. 7b

SHAPING DEVICE AND SHAPING METHOD FOR FORMING ROUNDED TIPS ON THE ENDS OF SAUSAGES

CROSS-REFERENCE TO RELATED APPLICATION

The present application claims the benefit of priority of European Patent Application No. 04029574.3, filed Dec. 14, 2004. The entire text of the priority application is incorporated by reference in its entirety.

FIELD OF THE DISCLOSURE

The invention relates to a shaping device and a method for forming rounded tips on the ends of sausages.

BACKGROUND OF THE DISCLOSURE

Devices for parting a continuously produced skein of sausages are already known for example from WO 03030646. With the known methods the skein is parted by tying off with, for example, two bar-shaped displacement elements, as illustrated in FIGS. 7a and 7b. Here, the displacement elements 8, 9 move towards one another and overlap, thereby shearing off the sausage skein 7. A disadvantage here is that no uniform support during displacement occurs, i.e. on tying off the sausage, and in particular when parting takes place simultaneously. Diagonal squashing of the parting point occurs, as can be seen in FIG. 7b. The displacement shears produce a sausage end which is misshapen on the side facing away from the displacement shears and is not closed off by the sausage sleeve. This is disadvantageous for the ensuing processes, such as for example smoking or roasting, because roast material can be emitted at this point. The above problems occur in particular with relatively soft sausage sleeves, such as for example sausage sleeves which are coextruded during the sausage production and have not yet become completely firm during tying off and parting. This type of coextrusion method is for example known from EP 1 371 293.

SUMMARY OF THE DISCLOSURE

Starting from this point, the object of the disclosure is to provide a device and a method which facilitates the tying off and/or parting of a continuously produced sausage skein, whereby simultaneously a rounded tip is formed on the ends of the sausage.

The shaping device according to the disclosure and the method according to the disclosure facilitate a uniform rounded tip formation at the ends of the sausages. Since the displacement assemblies in a tying position and/or parting position forth two aperture sections which widen out in the transport direction or against the transport direction and in which the sausage ends rest, the sausage skein is better enclosed at its ends during tying off and parting. Thus, the sausage end can be shaped as a rounded tip during tying off and/or parting. Misshapen or distorted squashing does not occur. This is a particular advantage with soft sausage sleeves, such as for example coextruded sausage sleeves, which are not completely firm during tying off and parting.

According to a preferred embodiment, the displacement assemblies each comprise a number of adjacent displacement elements. These displacement elements can be formed as flat plates, in particular as flat displacement sheets. The use of a number of adjacent flat plates for the displacement assemblies facilitates a simple and economical production of the shaping device, because the plates can be provided with a suitable profile in an easy way and can be combined such that they exhibit a certain shape for the two opening sections so that a desired rounded tip shape can be achieved on the end of the sausage. Furthermore, due to the multilayer construction, the weight of the displacement assemblies can be reduced.

According to a preferred embodiment, the displacement elements each comprise a scissors-shaped side profile at their front ends. A scissors-shaped side profile exhibits an opening which begins at the rearmost point and widens increasingly so that an appropriate displacement tip arises at the top and bottom on the end of the displacement element. This type of scissors-shaped profile may for example be V-shaped, C-shaped, etc.

It is advantageous if the displacement assemblies are aligned to one another such that the respective displacement elements are arranged offset with respect to one another so that the respective displacement elements can engage in one another when they are moved towards one another. Through this arrangement it is possible for the continuously produced sausage skein to be tied off and supported with a tool on one hand and on the other hand it can also be parted.

According to a preferred embodiment the displacement elements are arranged adjustable to one another in a displacement assembly. In this way the arrangement of the displacement elements in a displacement assembly can be adapted to different requirements, such as for example different sausage sleeve diameters, caliber and sausage sleeves.

The displacement elements of a displacement assembly can be aligned to one another such that the displacement elements protrude further to the front in the direction of the opposing displacement assembly the nearer they are to the central axis. Through this arrangement opening sections can be produced in a simple way which expand perpendicular to the transport direction of the filled sausage skein.

Preferably, a displacement assembly comprises at least three, preferably at least five, displacement elements. A smooth rounded tip shape can be better produced by layers of many thin displacement elements than by fewer thick displacement elements.

In an advantageous way the shaping device according to the disclosure is suitable both for tying off and also for parting. For tying off the sausage skein the displacement elements are moved together so far that the scissors-shaped profiles only partially overlap so that a passable opening remains between the scissors-shaped profiles, i.e. the two opening sections are connected to one another. This means that the filled displacement skein is tied off, i.e. that paste material in the sausage skein is displaced and the sausage skein is formed such that tip-shaped rounded ends form, but the sausage skein is however not parted by the displacement elements.

The same device is however also suitable for parting the filled sausage skein and namely when the displacement assemblies are moved further together. For parting the filled sausage skein the displacement elements of the displacement assemblies are moved close together and engage in one another such that the scissors-shaped profiles of the displacement elements overlap in the middle of the displacement assemblies so that no passable opening now remains between the scissors-shaped profiles, whereas the scissors-shaped side profiles of the outer displacement elements only partially overlap so that the corresponding opening sections between the profiles remain. Thus, the filled sausage skein can be parted by the displacement elements in the middle of the displacement assemblies and can be formed with a rounded tip shape by the more outer lying displacement elements which form the opening sections in which the ends of the sausage lie. Thus, with one and the same device, depending on the extent of the movement of the displacement assemblies, either tying off or parting can occur. If all the displacement elements are closed with an overlap for parting, then the sausage sleeve and the filling in the centre of the parting point cannot escape and are property punched out.

The shaping device according to the disclosure can comprise a further device which moves the displacement assemblies together either perpendicular to the transport direction of the filled sausage skein or moves the displacement assemblies together along a curve. If the displacement assemblies are moved for displacement perpendicular to the transport direction of the filled sausage skein, the transport of the sausage skein can be stopped briefly. If the displacement assemblies are moved together on a curved path, the sausage skein can be moved further during the tying off and/or parting.

BRIEF DESCRIPTION OF THE DRAWINGS

The disclosure is explained in more detail in the following with reference to the following figures.

FIG. 4 is a side elevation of the shaping device shown in FIG. 2, FIG. 5 is a plan view of the shaping device shown in FIG. 2, FIG. 6a shows a cross-section of a shaping device according to the disclosure for tying off a sausage skein according to a preferred embodiment of the disclosure, FIG. 6b shows a side elevation of the displacement assembly shown in FIG. 6a, FIGS. 7a, 7b show a device for parting a sausage skein according to the state of the art.

DETAILED DESCRIPTION OF THE DISCLOSURE

Figure 1:
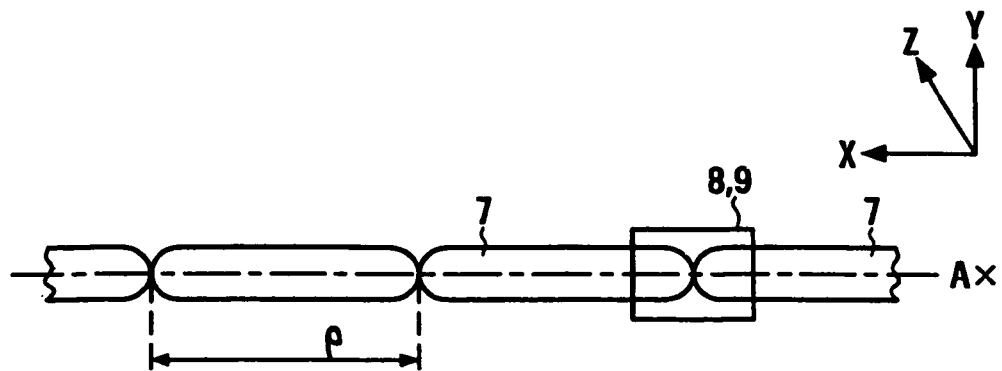
FIG. 1 is a schematic side elevation of the disclosure.

FIG. 1 shows the schematic structure of the device according to the disclosure for shaping rounded tips on the ends of sausages. FIG. 1 shows a continuously produced sausage skein, which is filled for example by a filler that introduces paste material into a sausage sleeve. The shaping device according to the disclosure can be particularly advantageously used when the filled sausage skein 7 has been produced by a coextrusion device, whereby the sausage sleeve is coextruded during the sausage production, and during tying off and parting is not yet completely firm and is therefore relatively soft. The sausage skein 7 thus produced is then either only tied off by the shaping device 8, 9 to divide the sausage skein into individual portions or it is parted into individual portions.

According to the disclosure a rounded tip on the ends of the sausage is produced during tying off and/or parting. Here, the devices for tying off and for shaping are realized in one unit 8, 9.

Figure 2:
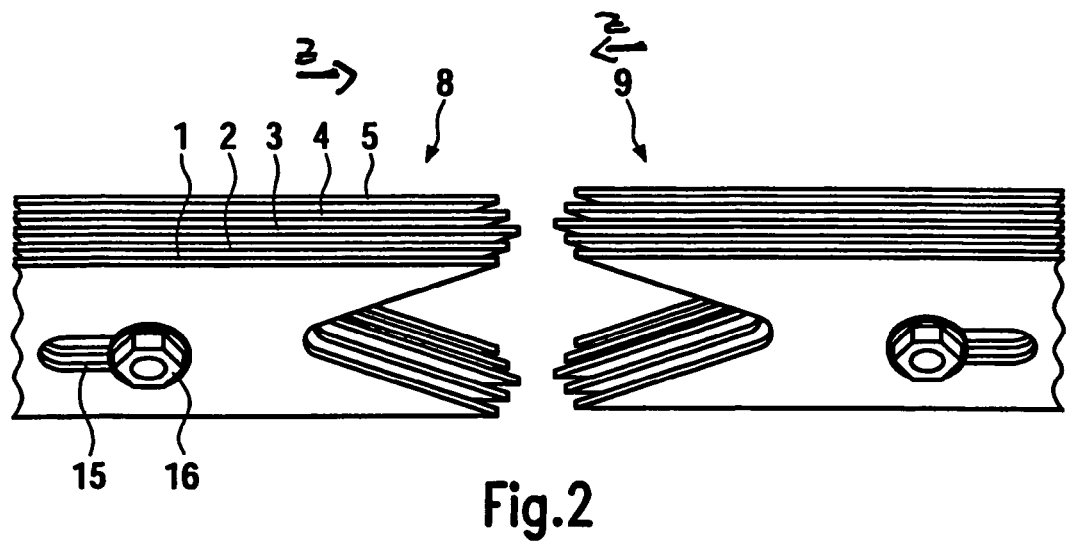
FIG. 2 is a perspective representation of a shaping device according to an embodiment of the disclosure in the open position.

FIG. 2 shows an embodiment of the disclosure in a perspective representation. The shaping device according to the disclosure for shaping the rounded tips comprises according to FIG. 3 two opposing displacement assemblies 8, 9, which, as indicated by the arrows Z, can be moved towards one another by a device which is not illustrated. Here, a displacement assembly 8, 9 comprises a number of adjacent displacement elements 1 to 5. In this embodiment the displacement elements are formed as flat plates, here displacement sheets. The displacement elements 1 to 5 are for example produced from steel. The displacement elements 1 to 5 are arranged here adjustable with respect to one another. In particular, the individual displacement elements are joined together via an elongated hole 15 with an appropriate screw 16 so that the displacement elements 1 to 5 can be moved in the Z direction.

As can also be seen from FIGS. 4 and 5, the individual displacement elements 1 to 5 exhibit a scissors-shaped side profile. The scissors-shaped side profile exhibits a rearmost point 6 from which the profile opening widens out to the front, i.e. in the Z direction, so that two displacement tips 11 arise on the upper and lower sides. In this embodiment the scissors-shaped side profile is V-shaped. The scissors-shaped side profile can however also be formed in a stepped C-shape, etc. provided the profile opening from the rearmost point 6 widens out to the top and bottom. The displacement elements 1 to 5 are here arranged such that the displacement element 3, which is located in the center M of the displacement assembly 8, 9, extends the furthest to the front, i.e. here in the Z direction towards the opposite displacement assembly 8, 9. Whereas the outermost displacement elements 1, 5 protrude a distance $L_1 < L_2$ to the front, the displacement elements 2, 4, which lie closer to the central axis M, protrude a distance $L_2$ in the Z direction, while the central displacement element 3 protrudes by a distance $L_3 > L_2$ with its tip 11 at the front. The distances can be adjusted with respect to one another. Preferably, the difference between $L_3$ and $L_2$ is approx. 1-5 mm and is similar between $L_2$ and $L_1$.

The thickness d of a displacement element 1 to 5 lies in the range from 0.5 mm to 3 mm. The distance k between two displacement elements is approx. 0.1 mm to 1 mm larger than the thickness d, such that the displacement elements 1 to 5 of opposing displacement assemblies can engage one another. The side surfaces of the displacement elements 1, 2, 4 and 5 preferably do not touch when engaging one another, whereas the side surfaces of the central displacement element 3 preferably touch, primarily when the portions are to be parted. The height of the displacement element lies in the range from 15 mm to 45 mm. The height h of the displacement elements depends on the diameter of the sausage skein, whereby with greater height, sausage skeins with a small diameter can also be processed. With this embodiment five displacement elements are used in each case. A smooth rounded tip shape can be better produced by layers of many thin displacement elements than by layers of fewer thick displacement elements.

The displacement assemblies 8, 9 are arranged such that, as can be seen from FIG. 2 and also as is clear from for example FIG. 6, they can engage one another when they are moved towards one another in the Z direction. On being moved towards one another, opening sections 10a, b (refer also to FIG. 6a) form due to the scissors-shaped profile and due to the offset arrangement of the displacement elements 1 to 5 (refer to FIGS. 4 and 5). The opening section 10a extends in the transport direction, i.e. In the X direction, whereas the second opening section 10b extends against the transport direction. The opening sections 10a, 10b widen out in the transport direction, respectively against the transport direction, whereby the opening sections are bordered by the profile edges of the displacement elements and the ends of the sausages of the sausage skein 7 come to rest during tying off in the opening sections 10a, b, as illustrated in FIG. 6a. The dimensions of the opening sections 10a, b increase from the central axis M of the sausage skein perpendicularly to the transport direction and namely in the Z-direction due to the offset displacement elements 1 to 5 and in the Y-direction due to the scissors-shaped profile. This means that the opening sections essentially widen out like a funnel (FIG. 3).

The previously described shaping device can be used for parting and for tying off.

In the following, firstly the use of the shaping device for parting is explained. The previously described shaping device 8, 9, according to the disclosure, is arranged, as can be seen in FIGS. 1 and 3, such that a continuously produced skein of sausages filled with paste material can be parted. Here, the opposing displacement assemblies 8, 9 are arranged in the Z direction, i.e. perpendicular to the transport direction X, so that the filled skein of sausages 7 can move in the transport direction X between the displacement assemblies 8, 9 with the aid of a transport device which is not shown, such as for example a conveyor belt, longitudinal unit, etc. Once the sausage skein 7 has been conveyed a distance p in the transport direction X, whereby p essentially corresponds to the length of the sausage, the opposing displacement assemblies 8, 9 are moved towards one another to tie off and part the filled sausage skein.

Figure 3:
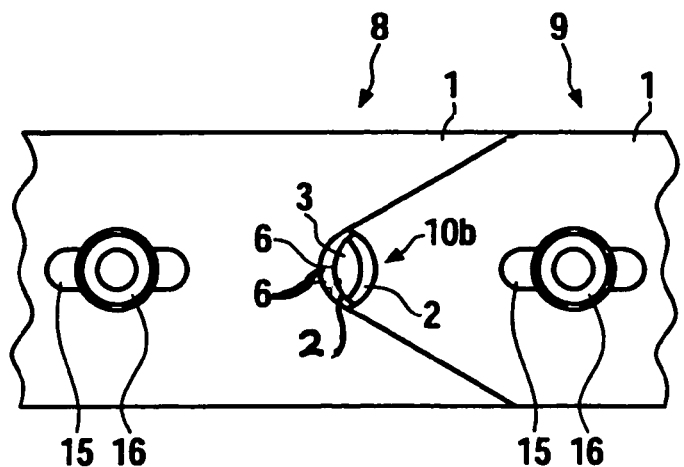
FIG. 3 is a schematic side elevation of the shaping device shown in FIG. 2 in a parting position.

When the displacement assemblies 8, 9 move towards one another, the individual displacement elements 1 to 5 engage one another, as shown in FIG. 3. The displacement elements 1 to 5 of the opposing displacement elements 8, 9 are moved so far towards one another and engage so far within one another that the scissors-shaped profiles of the displacement elements 3, which lie in the center M of the respective displacement assemblies, overlap completely, so that no passable opening remains between the scissors-shaped profiles of these displacement elements 3. The mutually facing surfaces of the displacement elements 3 here touch and part the sausage skein. The scissors-shaped side profiles of the outer displacement elements 1, 2, 4, 5 only partially overlap so that the corresponding opening sections 10*a*, *b* between the profiles remain, as can be seen from FIG. 3. In FIG. 3 it can be seen that the profiles of the central displacement elements 3 completely overlap and the displacement elements 2 and 1 only partially overlap so that in FIG. 3 the opening section 10*b* is created and on the opposite side in the transport direction the opening section 10*a* is created. As previously described, the respective opening section 10*a*, *b* widens out in a stepped manner essentially like a funnel. When the displacement assemblies 8, 9 thus move towards one another, as previously described, the sausage skein is parted by the displacement elements in the center 3, while the ends of the sausage of the following portions are simultaneously located in the opening sections 10*a*, *b* and can thus be formed with a rounded tip. Since only the profiles of the central displacement elements 3 completely overlap, a smooth cut is possible. If all the displacement elements are dosed with an overlap, then the sausage sleeve and the filling in the center of the parting point cannot escape and are properly punched out.

Following this, the displacement assemblies 8, 9 move away from one another and the sausage skein 7 is conveyed further by a distance p, whereupon the displacement assemblies 8, 9 again, as previously described, move towards one another to divide and part the filled sausage skein 7.

The previously explained shaping device is also suitable in the same way for tying off the sausage skein without parting it. In this case the same device is used and the individual steps in the method are the same as have been previously described, but the two displacement assemblies 8, 9 are not moved so close towards one another so that also the displacement elements 3 in the center of the corresponding displacement assemblies 8, 9 do not completely overlap so that the filled sausage skein is not parted. As can be seen, for example from FIG. 6*a*, which shows a cross-section, e.g. along the line 11 in FIG. 4 through the shaping device, the displacement elements 1 to 5 are moved towards one another only partially overlap so that a passable opening remains between the scissors-shaped profiles, so that the two opening sections 10*a*, *b* are joined to one another. From FIG. 6*a* it can be seen that the rearmost point 6 of the scissors-type profile is, even in the central section, spaced from the rearmost point 6 of the opposing displacement element 3. Due to the offset arrangement of the displacement elements and the scissors-shaped side profile, an opening section 10*a* or 10*b* is provided, as previously described, the dimension of which in the Z, respectively Y direction, widens out from the central axis M in the transport direction, respectively in the direction opposite to it. During tying off, the sausage skein lies in these opening sections and can thus assume a rounded tip shape.

It is also possible that, as previously described, the displacement assemblies tie off the filled sausage skein, but the sausage skein is then parted by a blade or similar implement located in the center.

With the method according to the disclosure both displacement elements can be moved towards one another using a suitable device perpendicular to the transport direction, i.e. in the Z direction. In this case the transport of the filled sausage skein is briefly interrupted until the tying off or parting stage is completed, whereupon the sausage skein is again moved by a distance p as previously described.

In order to ensure a continuous operation, both displacement assemblies 8, 9 can also be moved towards one another along a curve, as can be seen from FIG. 6*a*. This has the advantage that the displacement assemblies 8, 9 are also moved in the transport direction X during the tying off or during the parting so that the relative speed between the displacement assemblies and the sausage skein is relatively low, and where possible zero. Thus the sausage skein can be tied off or parted without the transport of the sausage skein 7 being stopped. The speed of the displacement assemblies is here defined such that the time which the displacement assemblies need to return to their starting point corresponds to the time in which the sausage sleeve 7 is moved by a distance p, so that the individual portion exhibits the correct length. Also the movement along a curve, as shown in FIG. 6*a*, is defined such that the displacement assemblies 8, 9 are again located in the tying off or parting position after a certain time which corresponds to the time which is needed to convey the sausage skein 7 by the distance p. The mechanism for moving the displacement assemblies can here for example comprise a drive which is formed such that the displacement assemblies 8, 9 rotate about an axis which extends in the Y direction, i.e. perpendicular to the transport direction. The guidance of the displacement assemblies along a curve can however also be realised by conventional means, such as a connecting link guide.

The disclosure has been explained here based on an example of a shaping device which comprises a number of adjacent displacement elements. However, it is also possible to form the displacement assemblies solidly provided that appropriate opening sections, which each widen out, are formed in the transport direction, respectively opposite the transport direction, for producing the rounded tips in a tying off position, i.e. in a position in which both displacement assemblies are moved towards one another.

We claim:

1. Shaping device for forming rounded tips on the ends of sausages and for tying off and/or parting a continuously produced sausage skein filled with paste material into single portions, the device comprising:
- two oppositely located displacement assemblies, which move towards one another and between which the filled sausage skein can be moved in a transport direction,
- the displacement assemblies being formed such that two opening sections, which widen out in the transport direction like a funnel, and opposite to the transport direction, respectively, are formed in a tying off and/or parting position between the two displacement assemblies,
- the displacement assemblies each comprising at least three flat displacement elements, wherein the displacement elements each exhibit a scissors-shaped side profile at their front end and which are located adjacently in the transport direction, and the displacement assemblies being aligned with respect to one another such that the respective displacement elements are arranged offset to one another such that the respective displacement elements engage in one another when the assemblies are moved towards one another, wherein the displacement elements of each displacement assembly are aligned to one another such that the displacement elements of one displacement assembly protrude further toward the other displacement assembly the closer the displacement elements are positioned to a central axis of the respective displacement assembly, the central axis being transverse to the transport direction and positioned substantially centered along the displacement assemblies in the transport direction.

2. Shaping device according to claim 1, wherein the displacement elements are formed as flat plates.

3. Shaping device according to claim 1, wherein the displacement elements of each displacement assembly are adjustable with respect to one another.

4. Shaping device according to claim 1, wherein the displacement elements are moved so far towards one another for tying off the sausage skein such that the scissors-shaped profiles only partially overlap so that a passable opening remains between the scissors-shaped profiles so that both opening sections are connected to one another.

5. Shaping device according to claim 4, wherein for parting the filled sausage skein the displacement elements of the displacement assemblies are moved close together and engage in one another such that the scissors-shaped profiles of the displacement elements completely overlap in a center of the displacement assemblies so that no passable opening now remains between the scissors-shaped profiles, whereas the scissors-shaped side profiles of two outermost displacement elements only partially overlap so that the corresponding opening sections between the profiles remain.

6. Shaping device according claim 1, wherein the device also comprises a mechanism which moves the displacement assemblies towards one another perpendicular to the transport direction of the filled sausage skein or moves the displacement assemblies towards one another along a curve.

7. Shaping device according to claim 2, wherein the flat plates are flat displacement sheets.

8. Shaping device according to claim 1, wherein a displacement assembly comprises at least five displacement elements.

9. Method of shaping rounded tips on the ends of sausages and for dividing and/or parting a continuously produced sausage skein filled with paste material with a shaping device that has two oppositely located displacement assemblies operable to move towards one another and between which a filled sausage skein can be moved in a transport direction, the method comprising:
- transporting a filled sausage skein between the two opposing displacement assemblies, and
- moving the displacement assemblies towards one another and displacing the paste material, wherein each displacement assembly comprises a plurality of at least three flat displacement elements wherein the displacement elements each exhibit a scissors-shaped side profile at their front end and which are located adjacently in the transport direction and arranged offset to one another and engaging in one another such that the displacement elements of one displacement assembly protrude further toward the other displacement assembly the closer the displacement elements are positioned to a central axis of the respective displacement assembly, the central axis being transverse to the transport direction and positioned substantially centered along the respective displacement assemblies in the transport direction, wherein, by engaging the displacement elements, two opening sections, which widen out in the transport direction, and opposite the transport direction like a funnel, respectively, are formed between the two displacement assemblies, wherein in each case a rounded tip is produced on the ends of the sausage.

10. Method according to claim 9, wherein after displacement, the filled sausage skein is either still linked together, wherein the paste material is only displaced or the sausage sleeve is parted to produce single portions.

11. Method according to claim 9, further comprising tying off the sausage skein by moving the displacement elements so far towards one another and engaging so far with one another that the scissors-shaped profiles on the front ends of the displacement elements partly overlap, so that a passable opening remains between the scissors-shaped profiles.

12. Method according to claim 9, further comprising parting the filled sausage skein by moving the displacement elements of the respective displacement assemblies so far towards one another that the scissors-shaped profiles in the center of the displacement assemblies completely overlap so that no passable opening now remains between the profiles, whereas the scissors-shaped side profiles of two outermost displacement elements only partially overlap so that the corresponding opening sections between the profiles remain.

13. Method according to claim 9, wherein the displacement elements of the displacement assemblies move perpendicular to the transport direction of the filled sausage skein while the transport of the sausage skein is briefly stopped.

14. Method according to claim 9, wherein the displacement assemblies move towards one another on a curved path so that the displacement assemblies move in the transport direction of the sausage skein during tying off and/or parting.

* * * * *